US008923757B2

(12) United States Patent
Poghosyan

(10) Patent No.: US 8,923,757 B2
(45) Date of Patent: Dec. 30, 2014

(54) METHOD, SYSTEM AND APPARATUS FOR SERVICE LOSS HANDLING

(75) Inventor: Areg Poghosyan, Kitchener (CA)

(73) Assignee: Blackberry Limited, Waterloo, Ontario (CA)

( * ) Notice: Subject to any disclaimer, the term of this patent is extended or adjusted under 35 U.S.C. 154(b) by 211 days.

(21) Appl. No.: 13/592,729

(22) Filed: Aug. 23, 2012

(65) Prior Publication Data

US 2014/0057551 A1 Feb. 27, 2014

(51) Int. Cl.
*H04B 7/185* (2006.01)

(52) U.S. Cl.
USPC .................. 455/13.1; 455/432.1; 455/553.1

(58) Field of Classification Search
USPC ........... 455/11.1, 12.1, 13.1, 422.1, 427, 428, 455/432.1, 433, 550.1, 552.1, 553.1
See application file for complete search history.

(56) References Cited

U.S. PATENT DOCUMENTS

| 4,831,518 A * | 5/1989 | Yu et al. ......................... 714/4.2 |
| 6,859,834 B1 | 2/2005 | Arora et al. |
| 2007/0115936 A1 * | 5/2007 | Newton ......................... 370/352 |

FOREIGN PATENT DOCUMENTS

| EP | 1703693 A1 | 9/2006 |
| WO | WO 98/26553 A1 | 6/1998 |

OTHER PUBLICATIONS

European Patent Application No. 12181603.7 European Search Report dated Jan. 30, 2013.

* cited by examiner

*Primary Examiner* — Nhan Le
(74) *Attorney, Agent, or Firm* — Perry + Currier, Inc.

(57) ABSTRACT

A method, system and apparatus for service loss handling are provided including a relay comprising an interface communicating first and second messages to a first relay communicating with a first service device, first messages associated with a first service provided by the first service device, second messages associated with other services provided by other service devices. The first relay relays first messages to the first service device; and relays second messages to other service devices. It is determined that the first relay is no longer in communication with the first service device; and, in response: first messages are queued for delayed relay to the first relay when the first relay is again in communication with the first service device; and/or first messages are rerouted to a second relay when the second relay is in communication with a second service device providing a same service as the first service device.

18 Claims, 12 Drawing Sheets

100

METHOD, SYSTEM AND APPARATUS FOR SERVICE LOSS HANDLING

FIELD

The specification relates generally to relays, and specifically to a method, system and apparatus for service loss handling.

BACKGROUND

When services are lost (e.g. an associated service device goes out of service permanently or temporarily) in a communication network, relays (including routers and the like) in the communication network, messages associated with the service can be erroneously relayed to the service.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
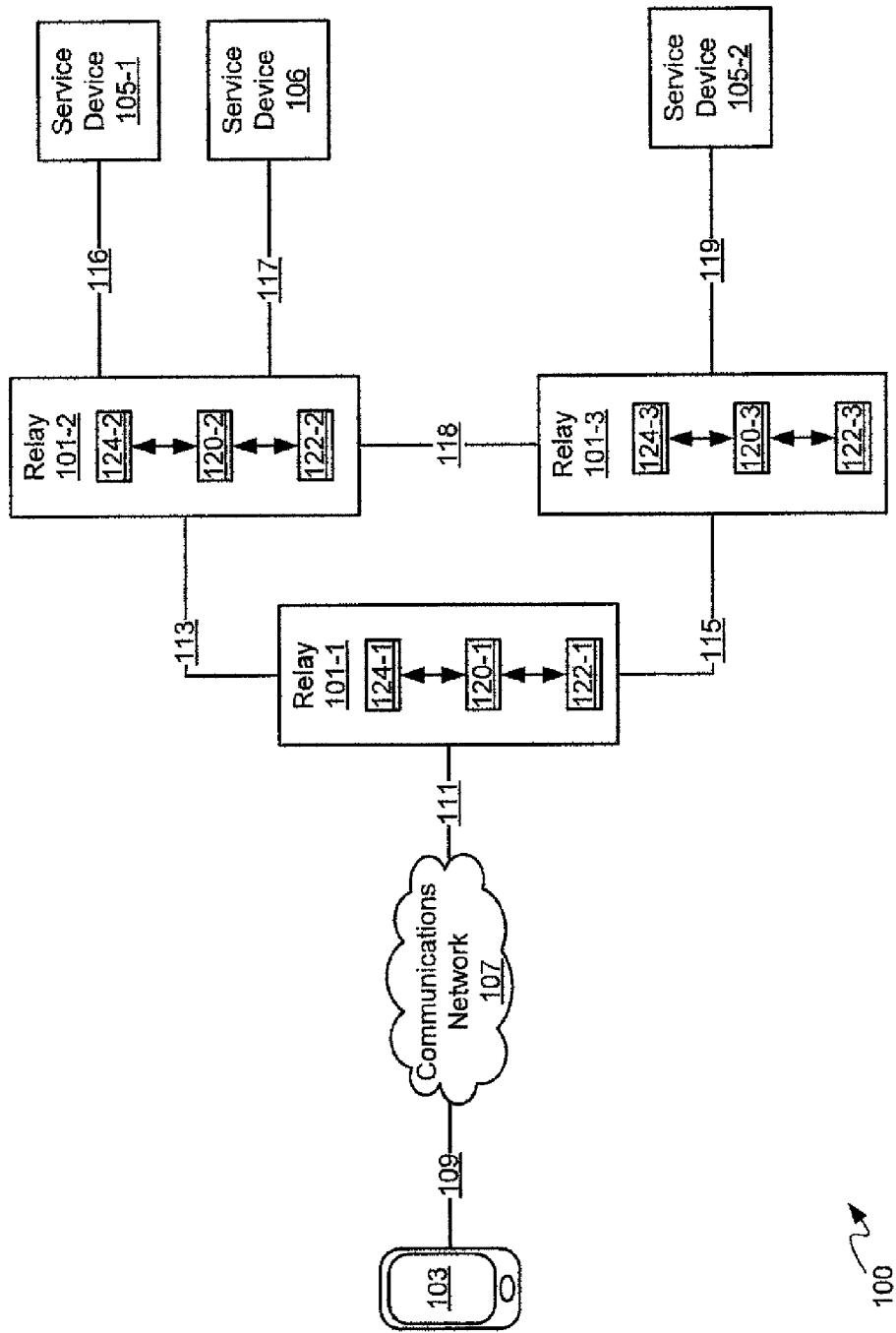
FIG. 1 depicts a system with efficient service loss handling, according to non-limiting implementations.

An aspect of the specification provides a relay device comprising: a processor; and, a communication interface enabled to communicate first messages and second messages to a first relay in communication with a first service device, the first messages associated with a first service associated with the first service device, the second messages associated with one or more second services associated with one or more other service devices, the first relay for: relaying the first messages to the first service device; and relaying the second messages to one or more of the other service devices, the processor enabled to: relay the second messages to the first relay; determine that the first relay is no longer in communication with the first service device; and, in response, one or more of, queue the first messages for delayed relay to the first relay when the first relay is again in communication with the first service device; and, reroute the first messages to a second relay when the second relay is in communication with a second service device providing a same service as the first service device.

The processor can be further enabled to: determine that the first relay is again in communication with the first service device; and, in response, relay the first messages to the first relay.

The processor can be further enabled to periodically query the first relay to determine when the first relay is again in communication with the first service device.

The processor can be further enabled to query the first relay to determine when the first relay is again in communication with the first service device at one of: a first frequency, when there are no other relays in communication with another service device providing the same service as the first service device; and, a second frequency, when the second relay is in communication with the second service device providing the same service as the first service device, the second frequency less than the first frequency.

Each of the first messages can comprise an identifier associated with the service provided by the service device.

Each of the second messages can comprise a respective identifier different from the first identifier.

The processor can be further enabled to determine that the first relay is no longer in communication with the first service device by receiving an indication from the first relay indicating that a service is unavailable for a given identifier associated with the service provided by the service device, the first messages comprising the given identifier. The indication can be received in response to transmitting a given message of the first messages to the first relay.

The processor can be further enabled to, when the first relay is in communication with the first service device and the second relay is in communication with the second service device, relay a first portion of the first messages to the first relay and relay a second portion of the first messages to the second relay.

The relay device can further comprise at least one of a router, a relay and a switch.

Another aspect of the specification provides a method comprising: at a relay device comprising a processor and a communication interface enabled to communicate first messages and second messages to a first relay in communication with a first service device, the first messages associated with a first service associated with the first service device, the second messages associated with one or more second services associated with one or more other service devices, the first relay for: relaying the first messages to the first service device; and relaying the second messages to one or more of the other service devices, relaying the second messages to the first relay; determining that the first relay is no longer in communication with the first service device; and, in response, one or more of, queuing the first messages for delayed relay to the first relay when the first relay is again in communication with the first service device; and, rerouting the first messages to a second relay when the second relay is in communication with a second service device providing a same service as the first service device.

The method can further comprise; determining that the first relay is again in communication with the first service device; and, in response, relaying the first messages to the first relay.

The method can further comprise periodically querying the first relay to determine when the first relay is again in communication with the first service device.

The method can further comprise querying the first relay to determine when the first relay is again in communication with the first service device at one of: a first frequency, when there are no other relays in communication with another service device providing the same service as the first service device; and, a second frequency, when the second relay is in communication with the second service device providing the same service as the first service device, the second frequency less than the first frequency.

Each of the first messages can comprise an identifier associated with the service provided by the service device.

Each of the second messages can comprise a respective identifier different from the first identifier.

The method can further comprise determining that the first relay is no longer in communication with the first service device by receiving an indication from the first relay indicating that a service is unavailable for a given identifier associated with the service provided by the service device, the first messages comprising the given identifier.

The indication can be received in response to transmitting a given message of the first messages to the first relay.

The method can further comprise, when the first relay is in communication with the first service device and the second relay is in communication with the second service device, relay a first portion of the first messages to the first relay and relay a second portion of the first messages to the second relay.

Yet a further aspect of the specification provides a computer program product, comprising a computer usable medium having a computer readable program code adapted to be executed to implement a method comprising: at a relay device comprising a processor and a communication interface enabled to communicate first messages and second messages to a first relay in communication with a first service device, the first messages associated with a first service associated with the first service device, the second messages associated with one or more second services associated with one or more other service devices, the first relay for: relaying the first messages to the first service device; and relaying the second messages to one or more of the other service devices, relaying the second messages to the first relay; determining that the first relay is no longer in communication with the first service device; and, in response, one or more of, queuing the first messages for delayed relay to the first relay when the first relay is again in communication with the first service device; and, rerouting the first messages to a second relay when the second relay is in communication with a second service device providing a same service as the first service device. The computer program product can comprise a non-transitory computer program product.

FIG. 1 depicts a system 100 comprising a first relay 101-1, a second relay 101-2, a third relay 101-3, a communication device 103, and service devices 105-1, 105-2, 106 relay 101-1 and communication device 103 in communication with a communication network 107, according to non-limiting implementations. Relays 101-1, 101-2, 101-3 will interchangeably be referred to hereafter, collectively, as relays 101 and generically as a relay 101. Communications device 103 will be interchangeably referred to hereafter as device 103. Service devices 105-1, 105-2, 106 will be interchangeably referred to hereafter as, collectively, as service devices 105, 106, and generically as a service device 105, 106. Communications network 107 will be interchangeably referred to hereafter as network 107. It is yet further appreciated that communication device 103 is in communication with network 107 via a link 109, relay 101-1 is in communication with network 107, and relays 101-2, 101-3 via respective links link 111, 113, 115, and relay 101-2 is initially in communication with service device 105-1 via a link 116 and service device 105-2 via a link 117. While optional, in depicted implementations, relays 101-2, 101-3 are in communication via a link 118. Further, while also optional, relay 101-3 can be in communication with service device 105-2 via a link 119. It is further appreciated that service device 105-2 can be optional.

Each relay 101 comprises a respective processor 120-1, 120-2, 120-3, interconnected with a respective memory 122-1, 122-2, 122-3 and a respective communication interface 124-1, 124-2, 124-3. Processors 120-1, 120-2, 120-3 will interchangeably be referred to hereafter collectively as processors 120 and generically as a processor 120. Memories 122-1, 122-2, 122-3 will interchangeably be referred to hereafter collectively as memories 122 and generically as a memory 122. Communication interfaces 124-1, 124-2, 124-3 will interchangeably be referred to hereafter collectively as interfaces 124 and generically as an interface 124.

It is further appreciated that system 100 can comprise any suitable number of devices similar to device 103, including hundreds to millions of devices. For example, system 100 can comprise handheld devices that are associated with accounts managed by an entity that operates at least a portion of network 107. For example, a user of device 103 can subscribe to services provided by the entity. As such, the entity can comprise a carrier operating at least a portion of network 107. As carriers are generally enabled to provide services to hundreds of thousands and even millions of subscribers, the number of devices in system 100 can be commensurate with a number of devices operated by a carrier.

Service devices 105, 106 each generally comprises a device enabled to provide a respective service to device 103, and other similar devices in system 100, including, but not limited to, a message service, an email service, a text message service, an internet browsing service and the like. For example, each of service devices 105, 106 can comprise one or more of a message server, an email server, a text message server, an internet server, a proxy server and the like.

However, service device 105-2 is generally enabled to provide a same service as service device 105-1; in other words, service device 105-2, when present, generally provides redundancy with service device 105-1, but further enables elements of system 100 to provide load balancing: for example, a first portion of messages associated with a service provided by service devices 105, in system 100, can be relayed to service device 105-1, while a second portion of messages associated with a service provided by service devices 105, in system 100, can be relayed to service device 105-2 according to any suitable load balancing algorithm. Such load balancing prevents and/or delays either of service devices 105 from being overwhelmed with messages associated with the service.

Further, service device 106 is generally enabled to provide a different service from service devices 105; for example service devices 105 can provide a message service, such as email, text messaging and the like, while service device 106 can provide an internet proxy service. In other words, relay 101-2 is generally enabled to relay messages associated with two different services to different service devices 105-1, 106.

While not depicted, in some implementations, relay 101-2 can be in communication with one or more other service devices providing one or more other services different from a first service provided by service device 105-1.

It is further appreciated that relays 101 are generally enabled to relay messages between device 103 and service devices 105, 106. For example, device 103 can transmit messages to service devices 105 when using a service associated with service devices 105, including, but not limited to messages for forwarding onto another device, and internet browser requests. In turn, service devices 105 can transmit messages to device 103, including, but not limited to messages received from other devices.

It is yet further appreciated that system 100 can comprise any suitable number of relays similar to relays 101, for example in regional, national, and worldwide networks; indeed, when system 100 comprises a worldwide network of relays, a number of relays 101 can be large (e.g. thousands, hundreds of thousands and the like).

Figure 2:
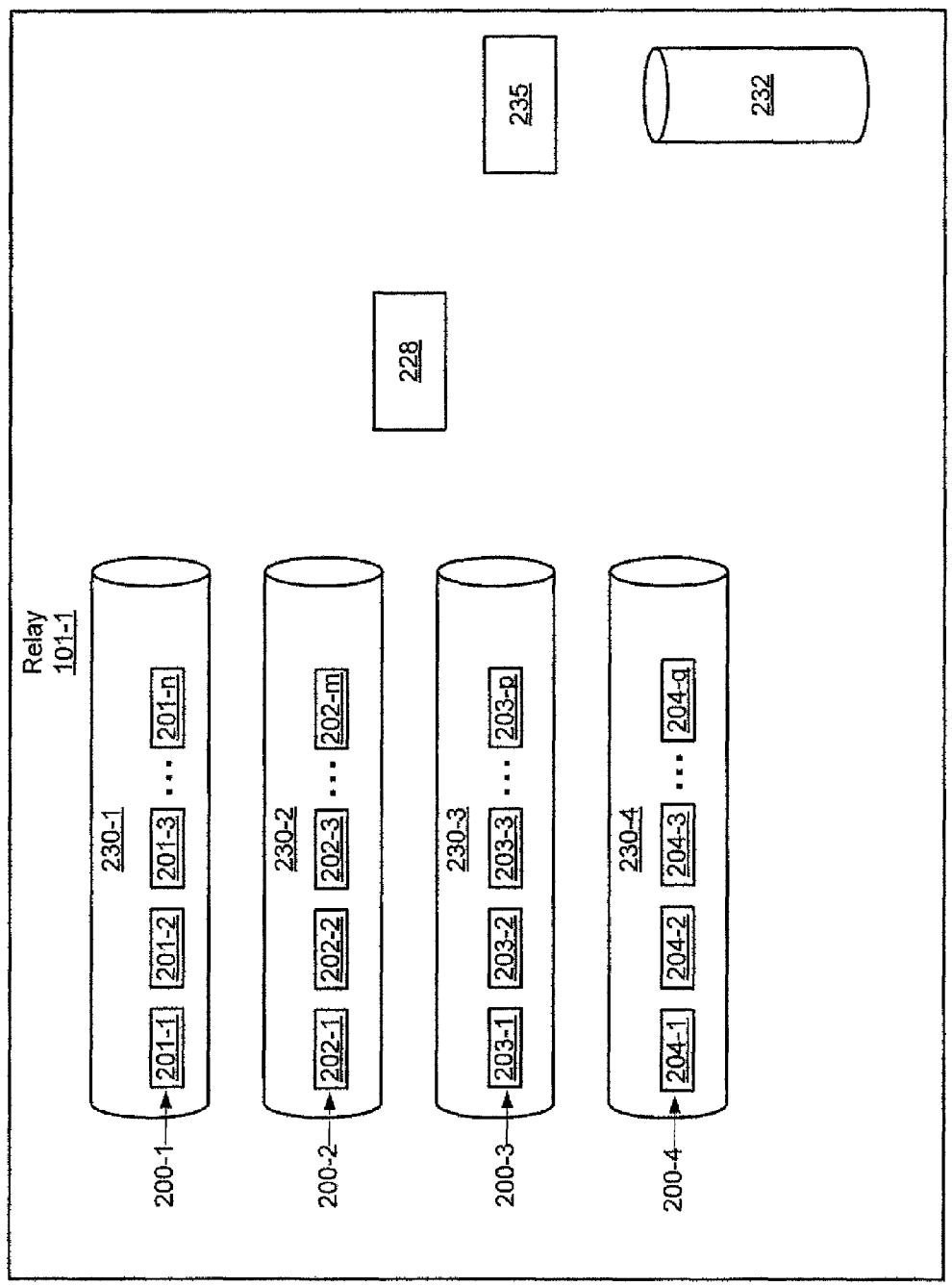
FIG. 2 depicts a schematic diagram of a first relay of the system of FIG. 1 showing elements related to relay processes, according to non-limiting implementations.

Attention is next directed to FIG. 2 which depicts a subset of elements of relay 101-1, but it is appreciated that all elements of relay 101-1 are nonetheless present. For example, while each relay 101 generally comprises a processor 120 interconnected with a memory 122 and a communications interface 124, they are not depicted in FIG. 2, but are nonetheless appreciated to be present: e.g. while processor 120-1 is not depicted at relay 101-1, it is nonetheless appreciated that processor 120-1 is present. Specifically, FIG. 2 provides a schematic diagram of relay 101-1 showing elements related to relay processes: a relay manager 228, connection objects 230-1, 230-2, 230-3, 230-4 and a routing table 232. Connection objects 230-1, 230-2, 230-3, 230-4 will interchangeably be referred to hereafter collectively as connection objects 230 and generically as a connection object 230.

In any event, processor 120-1 is generally enabled to operate relay manager 228 for managing connection objects 230. Furthermore memory 122-1 stores a routing table 232 for storing associations between connection objects 230 and relays 101-2, 101-3. For example: connection object 230-1 comprises a queue 200-1 of outbound messages 201-1, 201-2, 201-3 ... 201-$n$ to be transmitted to relay 101-2 received from other relays 101 and/or from device 103 or other similar devices and/or from service devices 105, 106; connection object 230-2 comprises a queue 200-2 of inbound messages 202-1, 202-2, 202-3 ... 202-$m$ received from relay 101-2 for relaying to other relays 101 and/or to device 103 or other similar devices and/or to service devices 105, 106; connection object 230-3 comprises a queue 200-3 of outbound messages 203-1, 203-3, 201-3 ... 201-$p$ to be transmitted to relay 101-3 received from other relays 101 and/or from device 103 or other similar devices and/or from service devices 105, 106; and connection object 230-4 comprises a queue 200-4 of inbound messages 204-1, 204-2, 204-3 ... 204-$q$ received from relay 101-3 for relaying to other relays 101 and/or to device 103 or other similar devices and/or to service devices 105, 106.

Queues 200-1, 200-2, 200-3 ... 200-4 will interchangeably be referred to hereafter collectively as queues 200 and generically as a queue 200.

Messages 201-1, 201-2, 201-3 ... 201-$n$ will interchangeably be referred to hereafter collectively as messages 201 and generically as a message 201.

Messages 202-1, 202-2, 202-3 ... 202-$m$ will interchangeably be referred to hereafter collectively as messages 202 and generically as a message 202.

Messages 203-1, 203-3, 201-3 ... 201-$p$ will interchangeably be referred to hereafter collectively as messages 203 and generically as a message 203.

Messages 204-1, 204-2, 204-3 ... 204-$q$ will interchangeably be referred to hereafter collectively as messages 204 and generically as a message 204.

It is yet further appreciated that processor 120-1 can provide relay manager 228 and connection objects 230 by processing an application 235 stored at memory 122-1; for example, application 235 can comprise an application for relaying messages and managing relaying of messages. Hence processor 120-1 processes application 235 to operate relay manager 228 and connection objects 230.

Further, relay manager 228 is generally enabled to manage which messages 201, 202, 203, 204 are in each queue 200. For example, relay manager 228 can further move inbound messages 202, 204 to an outbound connection object 230-1, 230-3: in other words, relay manager 228 can further manage relaying of messages received from one relay 101-2, 101-3 to another relay 101-2, 101-3 and/or to service devices 105, 106 and/or to device 103.

Further, messages 201 received at relay 101-1 for relay to service devices 105-1, 106 are queued in connection object 230-1 for relay to relay 101-2 as routing table 232 stores data indicative that service devices 105-1, 106 are in communication with relay 101-2. Similarly, messages 203 received at relay 101-1 for relay to service device 105-2 are queued in connection object 230-3 for relay to relay 101-3 as routing table 232 stores data indicative that service device 105-2 is in communication with relay 101-3. Further, as each of messages 201, 203 can be relayed to either service device 105, as each of messages 201, 203 are associated with a service provided by either service device 105, processor 120-1 can be further enabled to determined which of relays 101-2, 101-3 to relay messages 201, 203 via any suitable load balancing algorithm provided, for example, in application 235.

It is further appreciated that each of messages 201, 203 can further comprise an identifier, for example see identifier 505 of FIG. 5, described below, associated with a respective service provided by a destination service device 105, 106. The respective identifiers can be provisioned at device 103, and the like, such that, when messages 201, 203 are generated, the respective identifiers can be embedded in messages 201, 203. For example, a first portion of messages 201 can comprise an identifier associated with the service provided by service device 105-1. Further each of the remaining messages 203 can comprise a respective identifier different from the first identifier, the respective identifiers associated with services provided by other services devices, such as service device 106.

Indeed, it is further appreciated that not all connection objects 230 are depicted in FIG. 2, and relay 101-1 can comprise any suitable number of connection objects 230. For example, relay 101-1 can comprise more than one connection object 230 for exchanging messages with each of relays 101-

2, 101-3. Further, relay 101-1 can be in communication with relays other than relays 101-2, 101-3, and hence, relay 101-1 can comprise connection objects 230 for exchanging messages with each of the other relays with which relay 101-1 is connected. Further, relay 101-1 can comprise at least one connection object 230 for exchanging messages with each network 107, including, but not limited to, an inbound connection object associated with network 107 and an outbound connection object associated with network 107.

Figure 3:
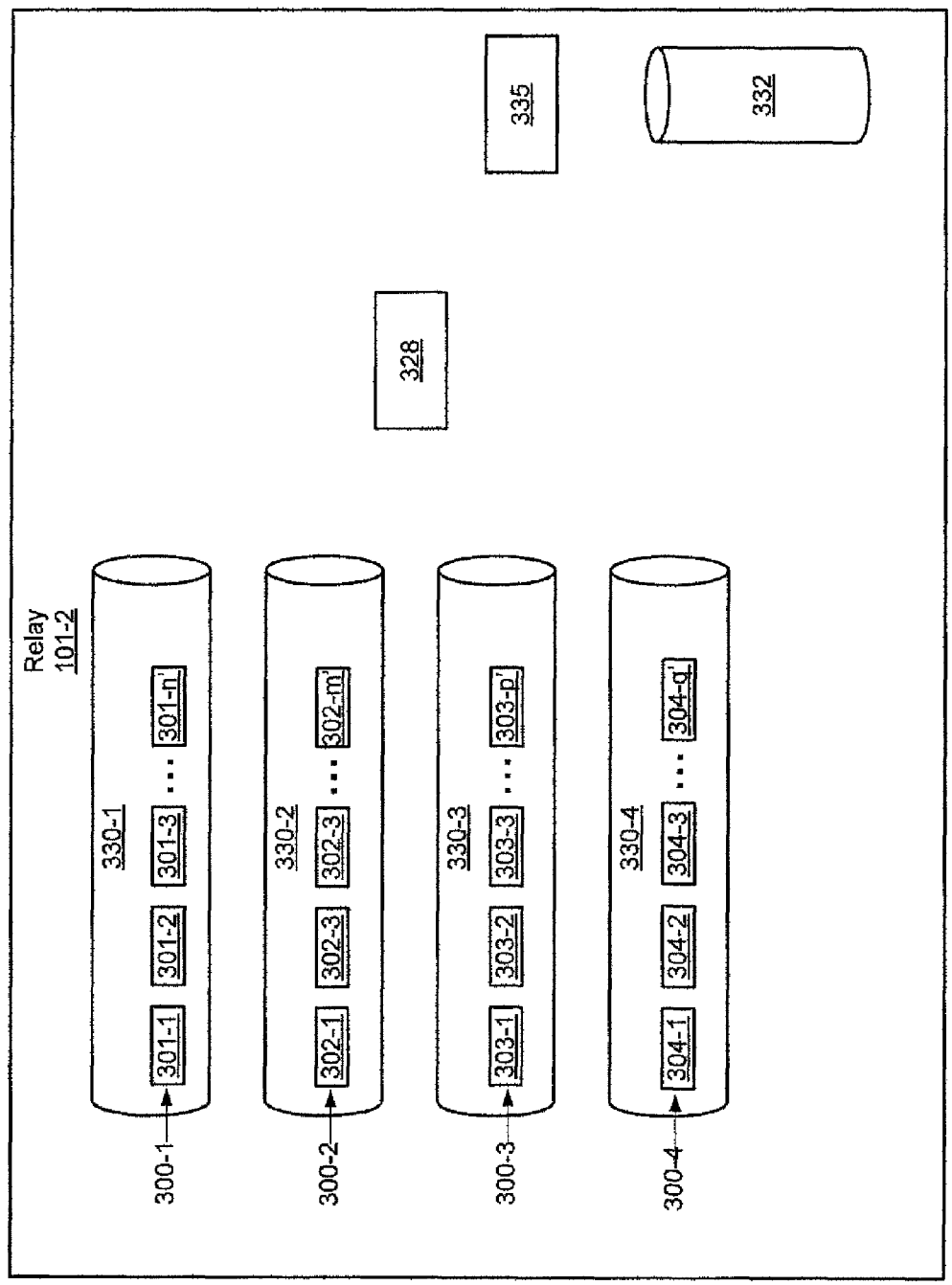
FIG. 3 depicts a schematic diagram of a second relay of the system of FIG. 1, initially in communication with a first service device of the system of FIG. 1 showing elements related to relay processes, according to non-limiting implementations.

Attention is next directed to FIG. 3 which depicts a subset of elements of relay 101-2, but it is appreciated that all elements of relay 101-2 are nonetheless present. For example, while processor 120-2 is not depicted at relay 101-2, it is nonetheless appreciated that processor 120-2 is present. Otherwise FIG. 3 is substantially similar to FIG. 2, with like elements having like numbers, but starting with a "3" rather than a "2", unless otherwise indicated. For example, queues 300-1, 300-2, 300-3, 300-4 are similar, respectively, to queues 200-1, 200-2, 200-3, 200-4.

Specifically, FIG. 3 provides a schematic diagram of relay 101-3 showing elements related to relay processes: a relay manager 328, connection objects 330-1, 330-2, 330-3, 330-4 and a routing table 332. Connection objects 330-1, 330-2, 330-3, 330-4 will interchangeably be referred to hereafter collectively as connection objects 330 and generically as a connection object 330.

In any event, processor 120-2 is generally enabled to operate relay manager 328 for managing connection objects 330. Furthermore memory 122-2 stores a routing table 332 for storing associations between connection objects 330 and relays 101-1, 101-3. For example: connection object 330-1 comprises a queue 300-1 of outbound messages 301-1, 301-2, 301-3 ... 301-$n'$ to be transmitted to relay 101-1 received from other relays 101 and/or from device 103 or other similar devices and/or from service devices 105, 106; connection object 330-2 comprises a queue 300-2 of inbound messages 302-1, 302-2, 302-3 ... 302-$m'$ received from relay 101-1 for relaying to other relays 101 and/or to device 103 or other similar devices and/or to service devices 105, 106; connection object 330-3 comprises a queue 300-3 of outbound messages 303-1, 303-3, 301-3 ... 301-$p'$ to be transmitted to relay 101-3 received from other relays 101 and/or from device 103 or other similar devices and/or from service devices 105, 106; and connection object 330-4 comprises a queue 300-4 of inbound messages 304-1, 304-2, 304-3 ... 304-$q'$ received from relay 101-3 for relaying to other relays 101 and/or to device 103 or other similar devices and/or to service devices 105, 106.

Queues 300-1, 300-2, 300-3 ... 300-4 will interchangeably be referred to hereafter collectively as queues 300 and generically as a queue 300.

Messages 301-1, 301-2, 301-3 ... 301-$n'$ will interchangeably be referred to hereafter collectively as messages 301 and generically as a message 301.

Messages 302-1, 302-2, 302-3 ... 302-$m'$ will interchangeably be referred to hereafter collectively as messages 302 and generically as a message 302.

Messages 303-1, 303-3, 301-3 ... 301-$p'$ will interchangeably be referred to hereafter collectively as messages 303 and generically as a message 303.

Messages 304-1, 304-2, 304-3 ... 304-$q'$ will interchangeably be referred to hereafter collectively as messages 304 and generically as a message 304.

It is yet further appreciated that processor 120-2 provides relay manager 328 and connection objects 330 by processing an application 335 stored at memory 122-2; for example, application 335 can comprise an application for relaying messages and managing relaying of messages. Hence processor 120-2 processes application 335 to operate relay manager 328 and connection objects 330.

Further, relay manager 328 is generally enabled to manage which messages 301, 302, 303, 304 are in each queue 300. For example, relay manager 328 can further move inbound messages 302, 304 to an outbound connection object 330-1, 330-3: in other words, relay manager 328 can further manage relaying of messages received from one relay 101-1, 101-3 to another relay 101-1, 101-3 and/or to service devices 105, 106 and/or to device 103.

Further, messages 302, 304 received at relay 101-2 for relay to service device 105-1, 106 are queued in respective connection object (not depicted) for relay to service devices 105-1, 106 as routing table 332 stores data indicates that service devices 105-1, 106 are in communication with relay 101-2. It is further appreciated that each of messages 302, 304 can further comprise an identifier, for example see identifier 505 of FIG. 5, described below, associated with a respective service provided by service device 105-1, 106. The respective identifiers can be provisioned at device 103, and the like, such that when messages 302, 304 are generated, the respective identifiers can be embedded in messages 302, 304. Messages 301, 303 can also comprise respective identifiers associated with a respective service provided by a service device.

It is further appreciated that not all connection objects 330 are depicted in FIG. 3 and relay 101-2 can comprise any suitable number of connection objects 330. For example, relay 101-2 can comprise more than one connection object 330 for exchanging messages with each of relays 101-1, 101-3. Further, relay 101-2 can be in communication with relays other than relays 101-1, 101-3, and hence, relay 101-2 can comprise connection objects 330 for exchanging messages with each of the other relays with which relay 101-2 is connected. Further, relay 101-2 can comprise at least one respective connection object 330 for exchanging messages with each of service devices 105-1, 106 including, but not limited to, an inbound connection object associated with service device 105-1 an outbound connection object associated with service device 105-1, an inbound connection object associated with service device 106 and an outbound connection object associated with service device 106.

Figure 4:
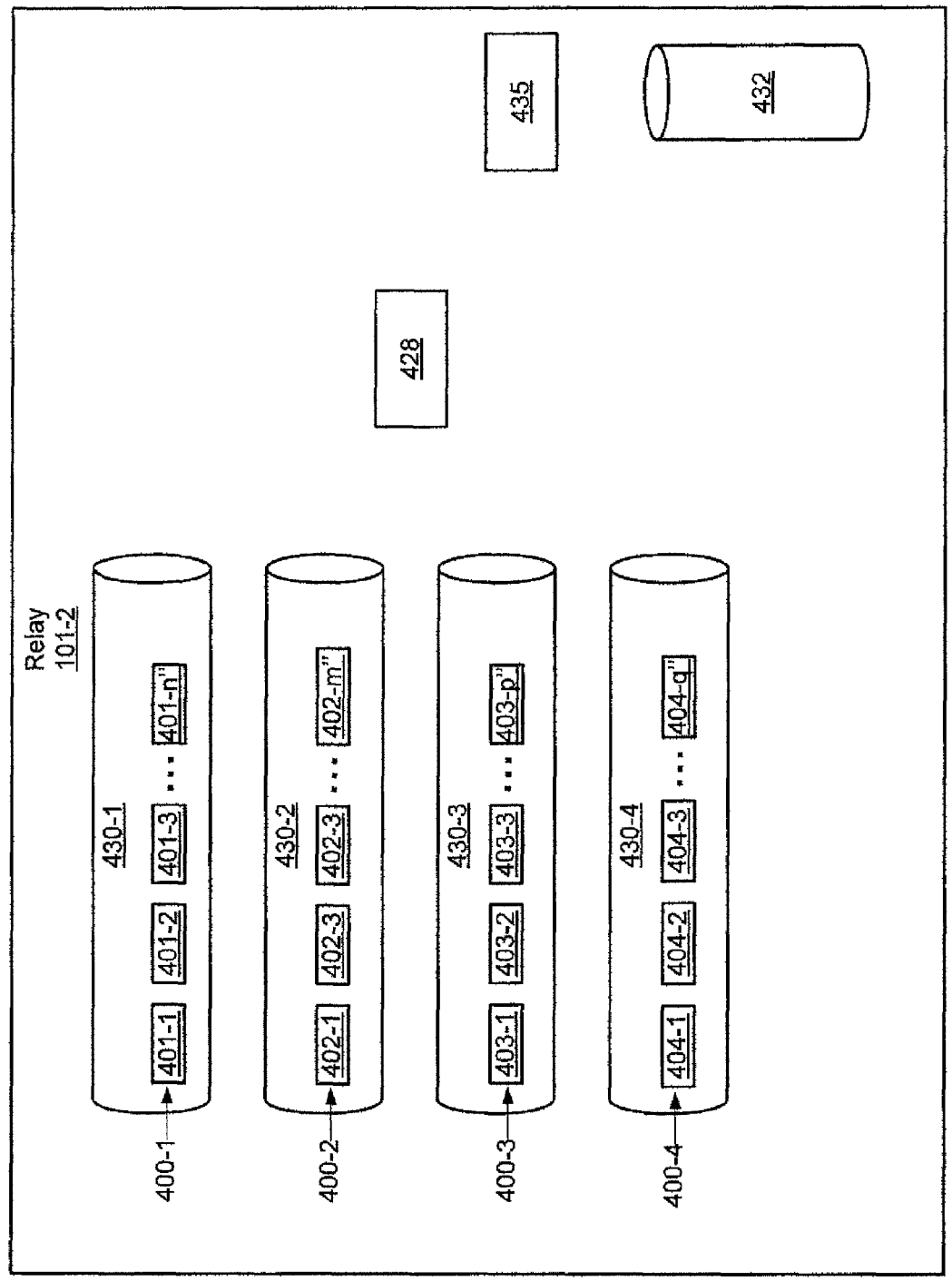
FIG. 4 depicts a schematic diagram of a third relay of the system of FIG. 1, which is optionally in communication with a second service device, of the system of FIG. 1 showing elements related to relay processes, according to non-limiting implementations.

Attention is next directed to FIG. 4 which depicts a subset of elements of relay 101-3, but it is appreciated that all elements of relay 101-3 are nonetheless present. For example, while processor 120-3 is not depicted at relay 101-3, it is nonetheless appreciated that processor 120-3 is present. Otherwise FIG. 4 is substantially similar to FIG. 3, with like elements having like numbers, but starting with a "4" rather than a "3", unless otherwise indicated. For example, queues 400-1, 400-2, 400-3, 400-4 are similar, respectively, to queues 300-1, 300-2, 300-3, 300-4.

Specifically, FIG. 4 provides a schematic diagram of relay 101-3 showing elements related to relay processes: a relay manager 428, connection objects 430-1, 430-2, 430-3, 430-4 and a routing table 432. Connection objects 430-1, 430-2, 430-3, 430-4 will interchangeably be referred to hereafter collectively as connection objects 430 and generically as a connection object 430.

In any event, processor 120-3 is generally enabled to operate relay manager 428 for managing connection objects 430. Furthermore memory 122-3 stores a routing table 432 for storing associations between connection objects 430 and relays 101-1, 101-2. For example: connection object 430-1 comprises a queue 400-1 of outbound messages 401-1, 401-2, 401-3 ... 401-$n''$ to be transmitted to relay 101-1 received from other relays 101 and/or from device 103 or other similar devices and/or from service devices 105, 106; connection object 430-2 comprises a queue 400-2 of inbound messages **402-1, 402-2, 402-3 . . . 402-*m*" received from relay 101-1 for relaying to other relays 101 and/or to device 103 or other similar devices and/or to service devices 105, 106; connection object 430-3 comprises a queue 400-3 of outbound messages 403-1, 403-3, 401-3 . . . 401-*p*" to be transmitted to relay 101-2 received from other relays 101 and/or from device 103 or other similar devices and/or from service devices 105, 106; and connection object 430-4 comprises a queue 400-4 of inbound messages 404-1, 404-2, 404-3 . . . 404-*q*" received from relay 101-2 for relaying to other relays 101 and/or to device 103 or other similar devices and/or to service devices 105, 106**.

Queues 400-1, 400-2, 400-3 . . . 400-4 will interchangeably be referred to hereafter collectively as queues 400 and generically as a queue 400.

Messages **401-1, 401-2, 401-3 . . . 401-*n*" will interchangeably be referred to hereafter collectively as messages 401 and generically as a message 401**.

Messages **402-1, 402-2, 402-3 . . . 402-*m*" will interchangeably be referred to hereafter collectively as messages 402 and generically as a message 402**.

Messages **403-1, 403-3, 401-3 . . . 401-*p*" will interchangeably be referred to hereafter collectively as messages 403 and generically as a message 403**.

Messages **404-1, 404-2, 404-3 . . . 404-*q*" will interchangeably be referred to hereafter collectively as messages 404 and generically as a message 404**.

It is yet further appreciated that processor 120-3 provides relay manager 428 and connection objects 430 by processing an application 435 stored at memory 122-3; for example, application 435 can comprise an application for relaying messages and managing relaying of messages. Hence processor 120-3 processes application 435 to operate relay manager 428 and connection objects 430.

Further, relay manager 428 is generally enabled to manage which messages 401, 402, 403, 404 are in each queue 400. For example, relay manager 428 can further move inbound messages 402, 404 to an outbound connection object 430-1, 430-3: in other words, relay manager 428 can further manage relaying of messages received from one relay 101-1, 101-2 to another relay 101-1, 101-2 and/or to service devices 105, 106, and/or to device 103.

Further, messages 403 received at relay 101-3 for relay to service device 105-2 are queued in a connection object associated therewith (not depicted) as routing table 432 stores data indicates that service device 105-2 is in communication with relay 101-3. It is further appreciated that each of messages 402, 404 can further comprise an identifier, for example see FIG. 5, described below, associated with a respective service provided by service device 105-2. The respective identifiers can be provisioned at device 103, and the like, such that when messages 402, 404 are generated, the respective identifiers can be embedded in messages 402, 404. Messages 401, 403 can also comprise respective identifiers associated with a respective service provided by a service device.

It is further appreciated that not all connection objects 430 are depicted in FIG. 4 and relay 101-3 can comprise any suitable number of connection objects 430. For example, relay 101-3 can comprise more than one connection object 430 for exchanging messages with each of relays 101-1, 101-2. Further, relay 101-3 can be in communication with relays other than relays 101-1, 101-2, and hence, relay 101-3 can comprise connection objects 430 for exchanging messages with each of the other relays with which relay 101-3 is connected. Further, relay 101-3 can comprise at least one connection object 430 for exchanging messages with service device 105-2, including, but not limited to, an inbound connection object associated with service device 105-2 and an outbound connection object associated with service device 105-2.

It is yet further appreciated that each connection objects 230, 330, 430 can comprise and/or be connected to respective TCP/IP (Transmission Control Protocol/Internet Protocol) connections and/or ports at each respective relay 101.

It is yet further appreciated that relay managers 228, 328, 428 and connection objects 230, 330, 430 can comprise one or more of hardware and software components. For example, logic for configuring relay managers 228, 328, 428 and connection objects 230, 330, 430 can be provided at respective applications 235, 335, 435, but each of connection objects 230, 330, 430 can further comprise at least a portion of one or more of respective processors 120 and respective interfaces 124.

It is yet further appreciated that, in some implementations, messages and/or data in system 100 can be propagated by hopping between relays 101. However, in other implementations, all relays 101 in system 100 are in communication with all other relays 101 in system 100, hence messages and/or data can be propagated between relays in a single hop respective to each relay 101.

It is further appreciated that elements of relays 101 described with reference to FIGS. 2 to 4 are not to be considered particularly limiting. For example, while a respective relay manager 228, 328, 428 is described with reference to each relay 101, in other implementations functionality of one or more relay managers 228, 328, 428 can be distributed between other elements of a respective relay 101, and indeed, each relay 101 need not have an element that performs all the functionality of the described relay managers 228, 328, 428.

It is yet further appreciated that each of relays 101 can generally be remote from one another.

Attention is next directed back to FIG. 1, and components of system 100 will be described hereafter.

Each of relays 101 can be any type of relay device and/or routing device and/or switching device that can be used to operate respective relay managers 228, 328, 428, and the like, and respective connection objects 230, 330, 430, and the like and maintain respective routing tables 232, 332, 432, as well as perform any other suitable functions for relaying respective messages. Each of relays 101 includes, but is not limited to, any suitable combination of communication devices, relay devices, routing devices, relay servers, routing servers, switches, switching devices and the like. Each of relays 101 can be based on any well-known relay and/or router environment including a module that houses one or more central processing units, volatile memory (e.g. random access memory), persistent memory (e.g. hard disk devices) and network interfaces to allow a relay 101 to communicate over respective links 111, 113, 115, 116 and the like. In some implementations, one or more of relays 101 can comprise one or more of a router and a switch.

For example, each of relays 101 can comprise a suitable relay device and/or routing device and/or switching device running a suitable system, each of relays 101 comprising one or more central processing units (including but not limited to processors 120) random access memory (including but not limited to memories 122, each of which can comprise any suitable combination of volatile and non-volatile memory). However, it is to be emphasized that a vast array of computing environments for relay 101 are contemplated. It is further more appreciated that each of relays 101 can comprise any suitable number of relay devices and/or routing devices and/or switching devices.

Device 103 can be any type of electronic device that can be used in a self-contained manner. Device 103 can include, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations. Device 103 can be based on any well-known computing environment including a module that houses one or more central processing units, volatile memory (e.g. random access memory), persistent memory (e.g. hard disk devices, flash memory devices) and network interfaces to allow device 103 to communicate over link 109.

Further, device 103 can be associated with an account for which a given service can, in turn, be associated. For example, device 103 can be enabled to interact with network 107 for email messaging, text messaging, internet browsing and the like, and a subscriber associated with device 103 can pay the entity for providing coverage of device 103 via network 107 and/or for a given service associated with service devices 105, 106.

Each of links 109, 111, 113, 115, 116, 117, 118, 119 comprises any suitable link for respectively enabling relays 101, device 103 and service devices 105, 106 to communicate with each other and with network 107. Links 109, 111, 113, 115, 116, 117, 118, 119 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

It is appreciated that FIG. 1 further depicts a schematic diagram of each relay 101 according to non-limiting implementations. It should be emphasized that the structure of relays 101 in FIG. 1 is purely an example, and contemplates a device that can be to relay respective messages in system 100. However, while FIG. 1 contemplates relay devices enabled to relay messages, in other implementations, each relay 101 can comprise a device enabled for both relaying messages and providing services: for example, relay 101 can both implement relay functionality and provide services similar to service devices 105, 106.

Each respective processor 120 (which can be implemented as a plurality of processors, including but not limited to one or more central processors (CPUs)) is configured to communicate with each respective memory 122 comprising a respective non-volatile storage unit (e.g. Erasable Electronic Programmable Read Only Memory ("EEPROM"), Flash Memory) and a respective volatile storage unit (e.g. random access memory ("RAM")). Programming instructions that implement the functional teachings of relay 101 as described herein are typically maintained, persistently, in a respective memory 122 and used by respective processor 120 which makes appropriate utilization of respective volatile storage during the execution of such programming instructions. Those skilled in the art recognize that each memory 122 is an example of computer readable media that can store programming instructions executable on a respective processor 120. Furthermore, each memory 122 is also an example of a memory unit and/or memory module.

In particular, it is appreciated that each memory 122 stores respective applications 235, 335, 435 that, when processed by a respective processor 120, enables processor 120 to manage relaying of messages in system 100. Further, processing of application 235 by processor 120-1 enabled processor 120-1 to: relay messages for a service provided by service device 106 to relay 101-2; determine that relay 101-2 is no longer in communication with service device 105-1; and, in response, one or more of, queue messages for a service provided by service device 105-1 for delayed relay to relay 101-2 when relay 101-2 is again in communication with service device 105-1; and reroute messages for a service provided by service device 106 to relay 101-3 when relay 101-3 is in communication with service device 105-2 providing a same service as service device 105-1.

It is yet further appreciated that each application 235, 335, 435 is an example of programming instructions stored at a respective memory 122.

Each processor 120 also connects to a respective interface 124, each of which can be implemented as one or more connectors and/or network adaptors and/or radios, configured to communicate with network 107 and/or other relays 101 and/or service device 105 via respective links 111, 113, 115, 116, 117, 118, 119. In general, it will be appreciated that each interface 124 is configured to correspond with the network architecture that is used to implement respective links 111, 113, 115, 116, 117, 118, 119, as described above. In other implementations a plurality of links with different protocols can be employed at each relay 101 and thus a respective interface 124 can comprise a plurality of interfaces to support each type of respective link. In any event, it is appreciated that any suitable combination of interfaces is within the scope of present implementations.

It is yet further appreciated that: at relay 101-1, each of connection objects 230 receives and/or transmits messages via interface 124-1; at relay 101-2, each of connection objects 330 receives and/or transmits messages via interface 124-2; and at relay 101-3, each of connection objects 430 receives and/or transmits messages via interface 124-3.

Further, it should be understood that in general a wide variety of configurations for each relay 101 are contemplated.

It is yet further appreciated that each of service devices 105, 106 can comprise relay functionality as well as service functionality and can be similar, at least in part to one or more of relays 101, and hence comprises at least a respective processor, a respective communication interface and a respective memory, the respective processor for carrying out processing instructions stored at the respective memory to provide the functionality of service devices 105, 106.

Figure 5:
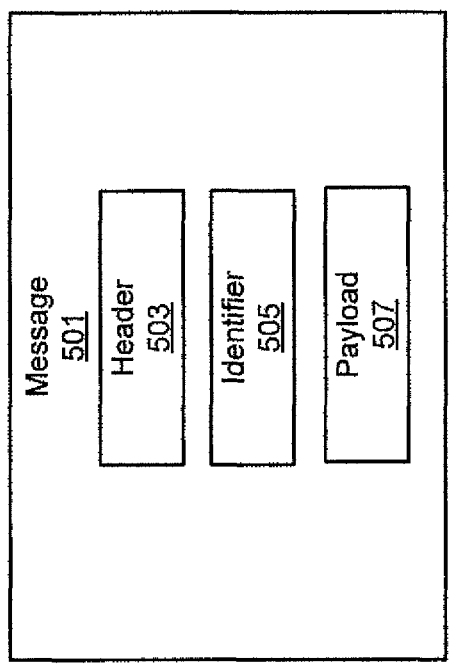
FIG. 5 depicts a format of a message transmitted in the system of FIG. 1, according to non-limiting implementations.

Attention is next directed to FIG. 5 which depicts a non-limiting format of a message 501 transmitted by device 103 in association with a service provided by one or more of service devices 105, 106. Messages 501 can be generated by an associated client at device 103. Message 501 can comprise a header 503, an identifier 505 and a payload 507. Each of messages 201, 202, 203, 204, 301, 302, 303, 304, 401, 402, 403, 404 can comprise the format of message 501; in any event, each of messages 201, 202, 203, 204, 301, 302, 303, 304, 401, 402, 403, 404 comprises an identifier similar to identifier 505.

Header 503 can comprise any suitable data for routing message 501 to relay 101-1, including, but not limited, internet protocol (IP) data, an identifier of a destination device, and identifier of device 103 and the like. Identifier 505 comprises an identifier associated with a service provided by service devices 105 or service device 106. In general, identifier 505 enables relay 101-1 to relay message 501 to one of relay 101-2, 101-3, depending on the service identified by identifier 505. For example, as message 501 is generated by a client associated with a service provided by one of service devices 105 and service device 106, the client can be provisioned with identifier 505 and further provide identifier 505 when message 501 is generated by the client.

Payload 507 comprises data to be delivered to one or more of a destination device and a service device 105, 106 associated with message 501, including, but not limited to, message data, text data, a browser request and the like.

Figure 6:
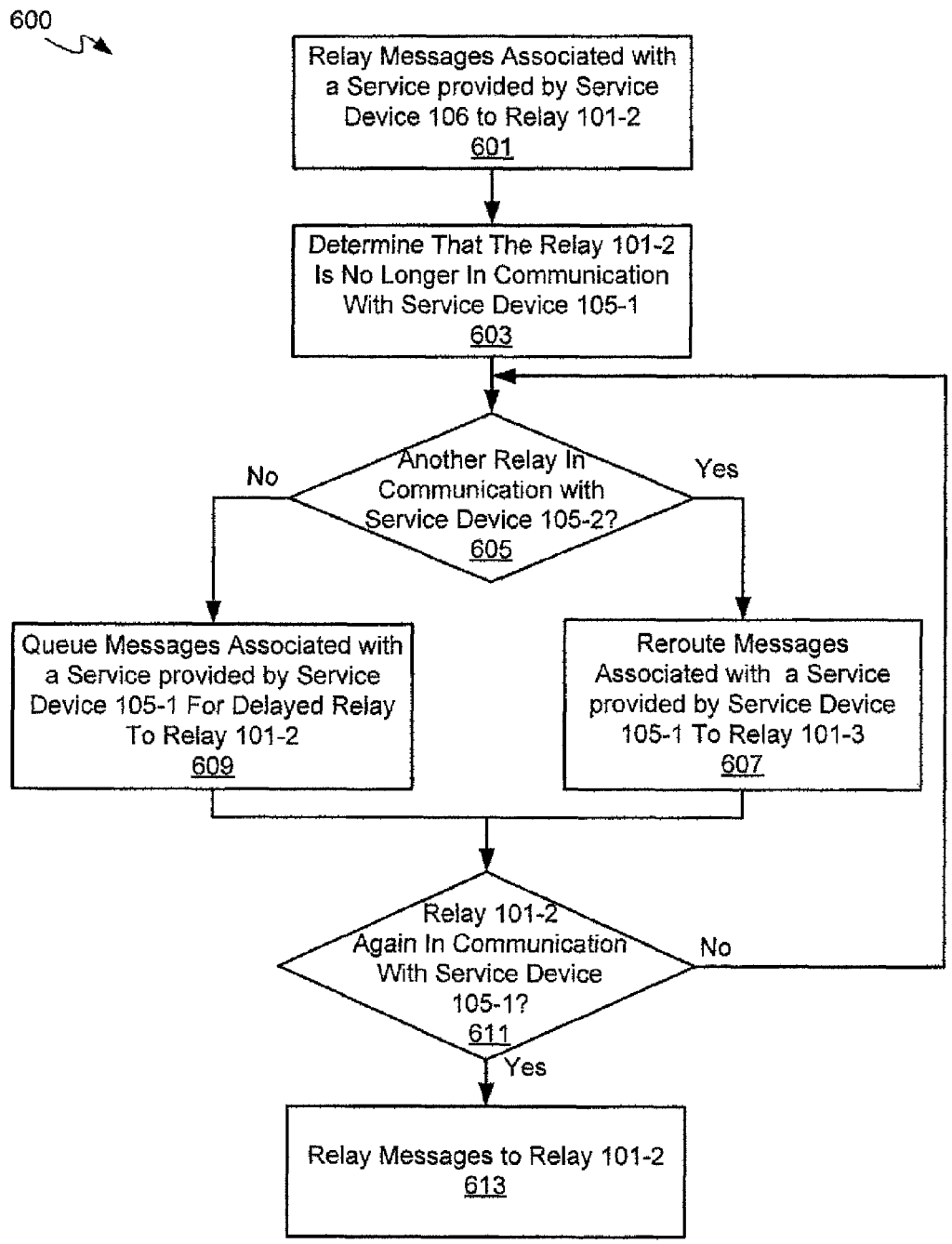
FIG. 6 depicts a flowchart of a method for efficient service loss handling at the first relay of FIG. 2, according to non-limiting implementations.

Attention is now directed to FIG. 6 which depicts a flowchart of a method 600 for service loss handling, according to non-limiting implementations. In order to assist in the explanation of method 600, it will be assumed that method 600 is performed using system 100. Furthermore, the following discussion of method 600 will lead to a further understanding of system 100 and its various components. However, it is to be understood that system 100 and/or method 600 can be varied, and need not work exactly as discussed herein in conjunction with each other, and that such variations are within the scope of present implementations.

It is appreciated that, in some implementations, method 600 is implemented in system 100 by processor 120-1 of relay 101-1. Indeed, method 600 is one way in which relay 101-1 can be configured. It is to be emphasized, however, that method 600 need not be performed in the exact sequence as shown, unless otherwise indicated; and likewise various blocks may be performed in parallel rather than in sequence; hence the elements of method 600 are referred to herein as "blocks" rather than "steps". It is also to be understood, however, that method 600 can be implemented on variations of system 100 as well.

It is further assumed in method 600 that interface 124-1 is enabled to communicate first messages and second messages to relay 101-2, which is turn in communication with first service device 105-1, as described above, the first messages associated with a first service associated with service device 105-1, the second messages associated with one or more second services associated with one or more other service devices, including service device 106, relay 101-2 for: relaying the first messages to first service device 105-1; and relaying the second messages to one or more of the other service devices, such as service device 106.

Figure 8:
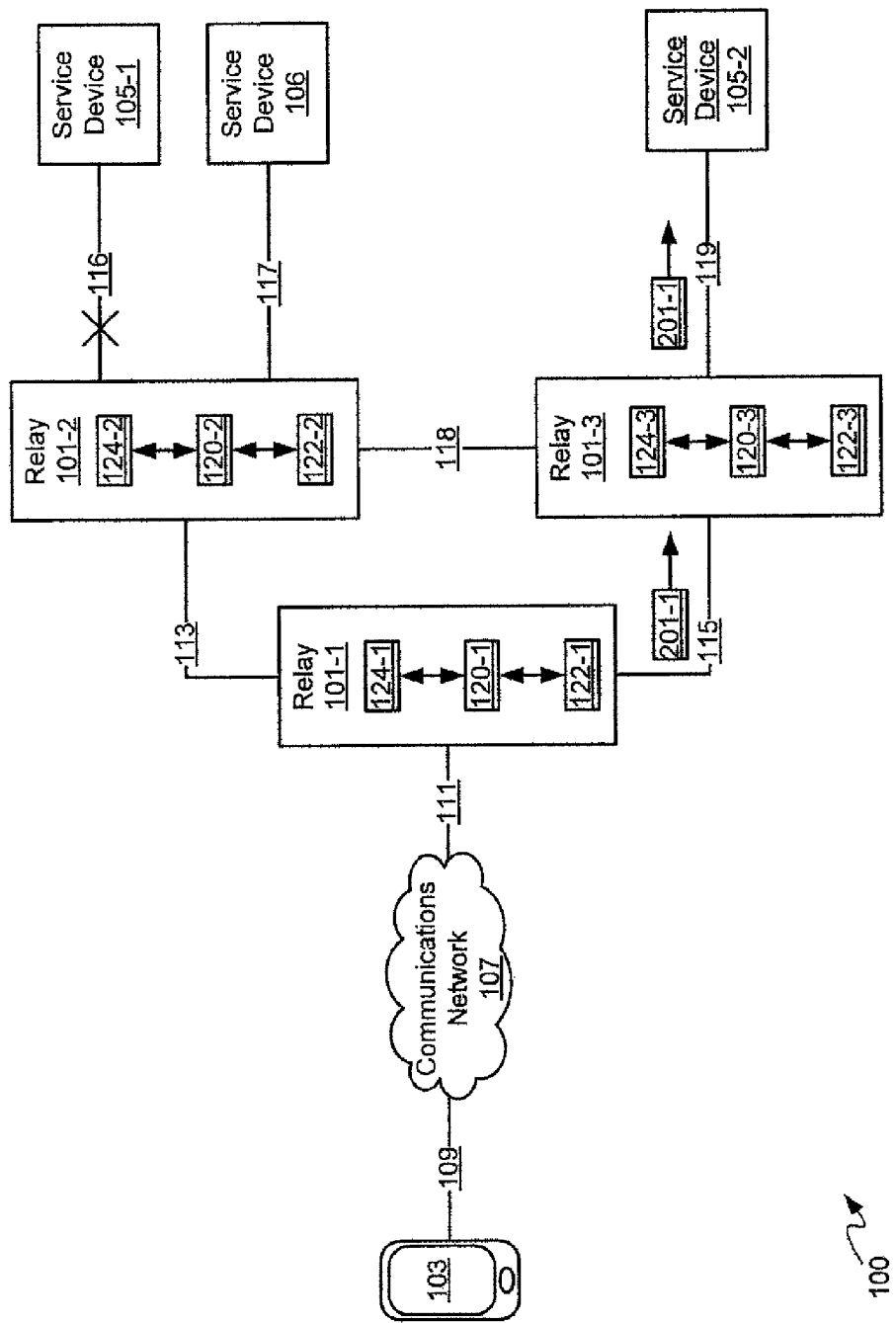
FIG. 8 depicts the system of FIG. 1 with messages intended for a first service device being rerouted to the third relay in communications with a second device, according to non-limiting implementations.
Figure 9:
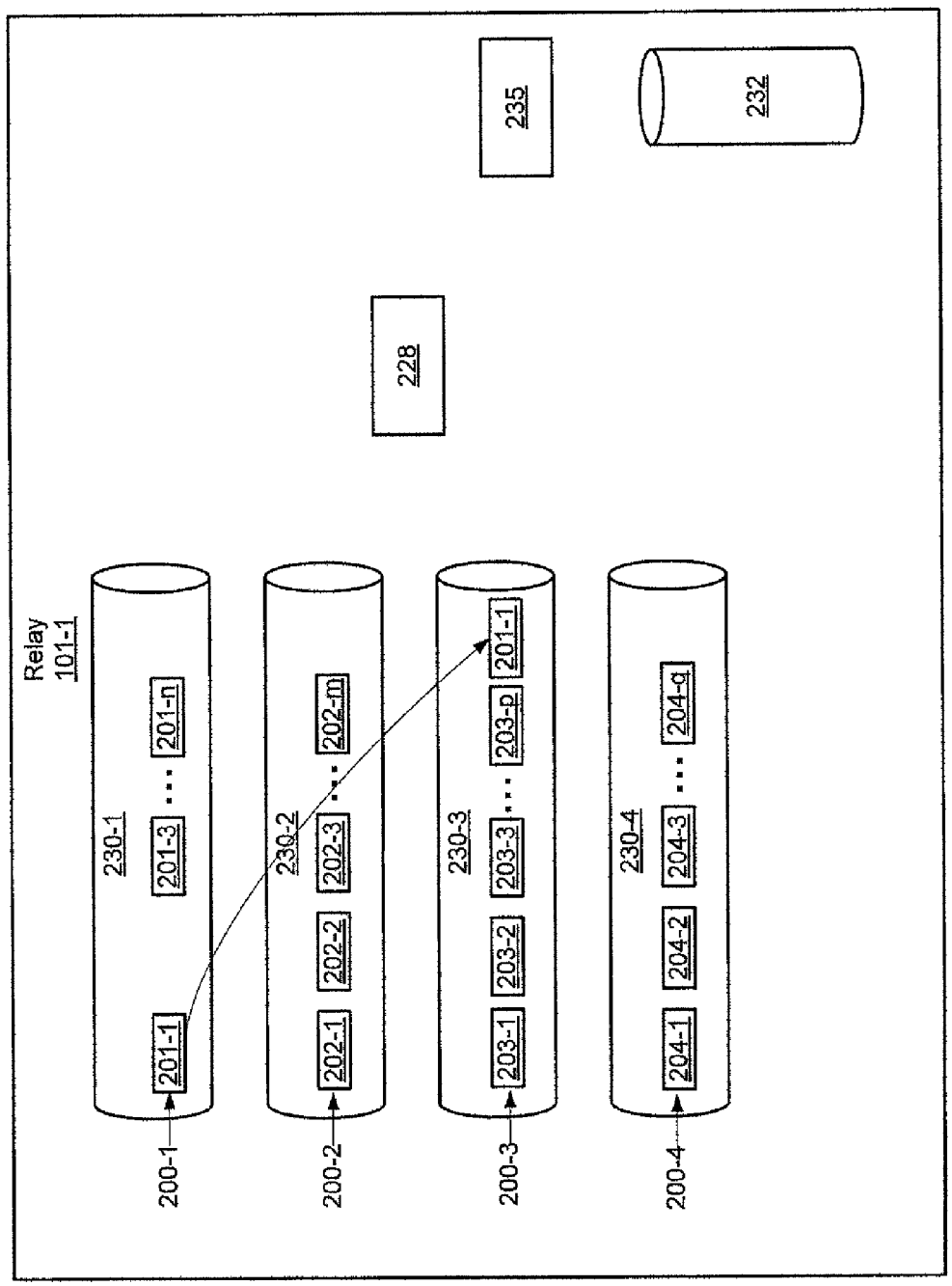
FIG. 9 depicts the relay of FIG. 2, with messages intended for the first service device being rerouted from an outbound connection object associated with the second relay to an outbound connection object associated with the third relay, according to non-limiting implementations.
Figure 10:
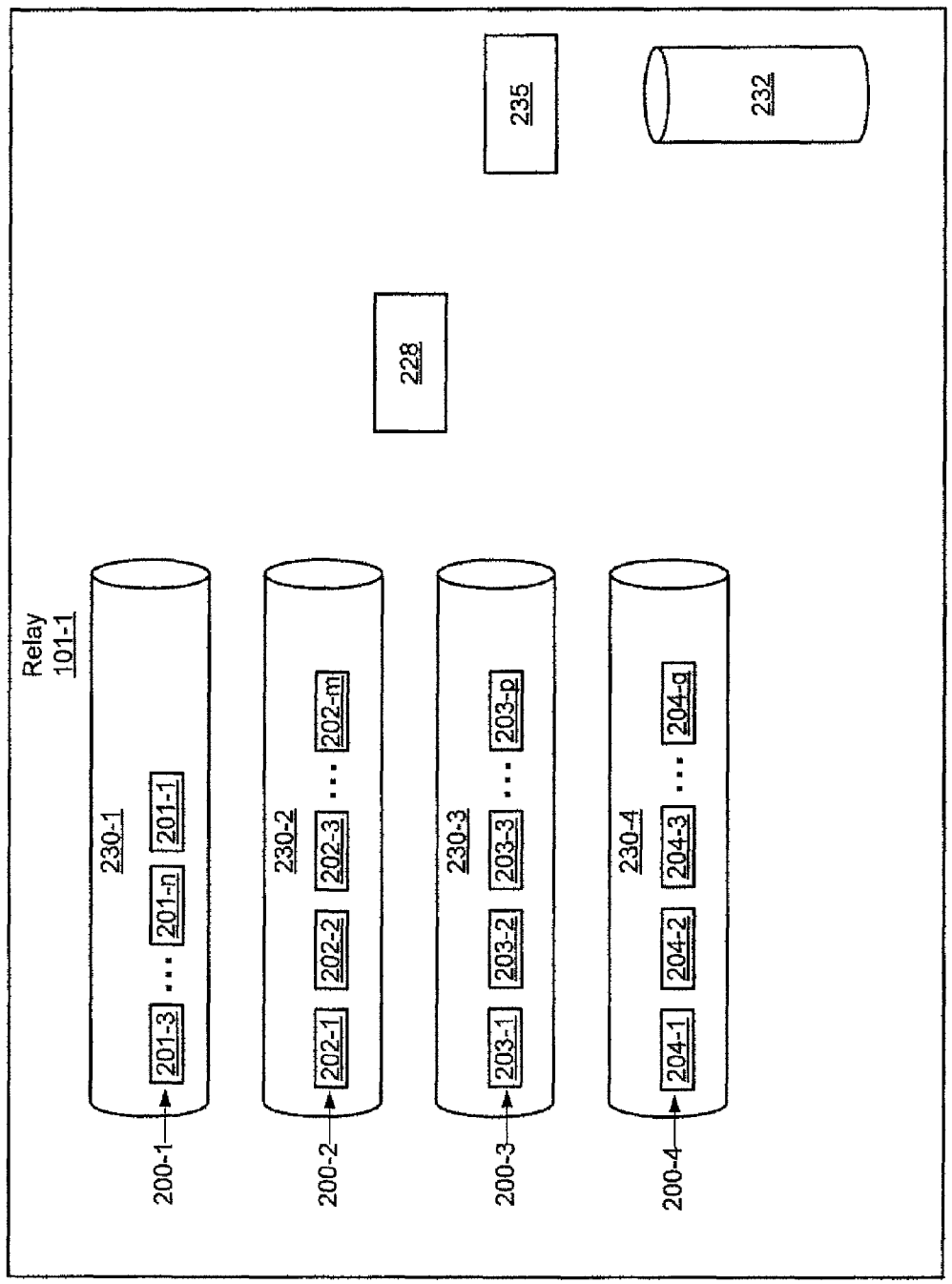
FIG. 10 depicts the relay of FIG. 2, with messages intended for the first service device queued at an outbound connection object associated with the second relay to wait for the second relay to re-establish communications with the first service device, according to non-limiting implementations.

Further, method 600 is described with reference to FIGS. 7, 8 and 11, each of which are similar to FIG. 1, with like elements having like numbers, and FIGS. 9 and 10, each of which are similar to FIG. 2, with like elements having like numbers.

At block 601, processor 120-1 relays messages associated with a service provided by service device 106 to relay 101-2. For example attention is directed to FIG. 7: device 103 generates a message 201-1 associated with a service provided by service devices 105; message 201-1 can be generated by a client associated with the service provided by service devices 105. Device 103 and/or another similar device, also generates a message 201-2 associated with the service provided by service device 106; message 201-2 can be generated by another client associated with the service provided by service device 106.

When each of messages 201-1, 201-2 are received at relay 101-1, processor 120-1, and/or relay manager 228, determines from their respective identifiers, similar to identifier 505, with which respective service each is associated. Hence, as message 201-2 is associated with a service provided by service device 106, processor 120-1 and/or relay manager 228 relays message 201-2 to relay 101-2, via link 113, which in turn relays message 201-2 to service device 106 via link 117. Indeed, processor 120-2 can determine that message 201-2 is associated with the service provided by service device 106 from the identifier in message 201-2.

At block 603 processor 120-1 determines that relay 101-2 is no longer in communication with first service device 105-2. For example, in implementations depicted in FIG. 7, as message 201-2 is associated with a service provided by either of service devices 105, processor 120-1 and/or relay manager 228 can relay message 201-1 to relay 101-2 or relay 101-3 according, for example, to any suitable load balancing algorithm. However, in implementation depicted in FIG. 7, relay 101-1 relays message 201-1 to relay 101-2, as determined from, for example, the load balancing algorithms. Alternatively, as service device 105-2 is optional, routing table 232 can indicate that only service device 105-1 can provide the service.

Figure 7:
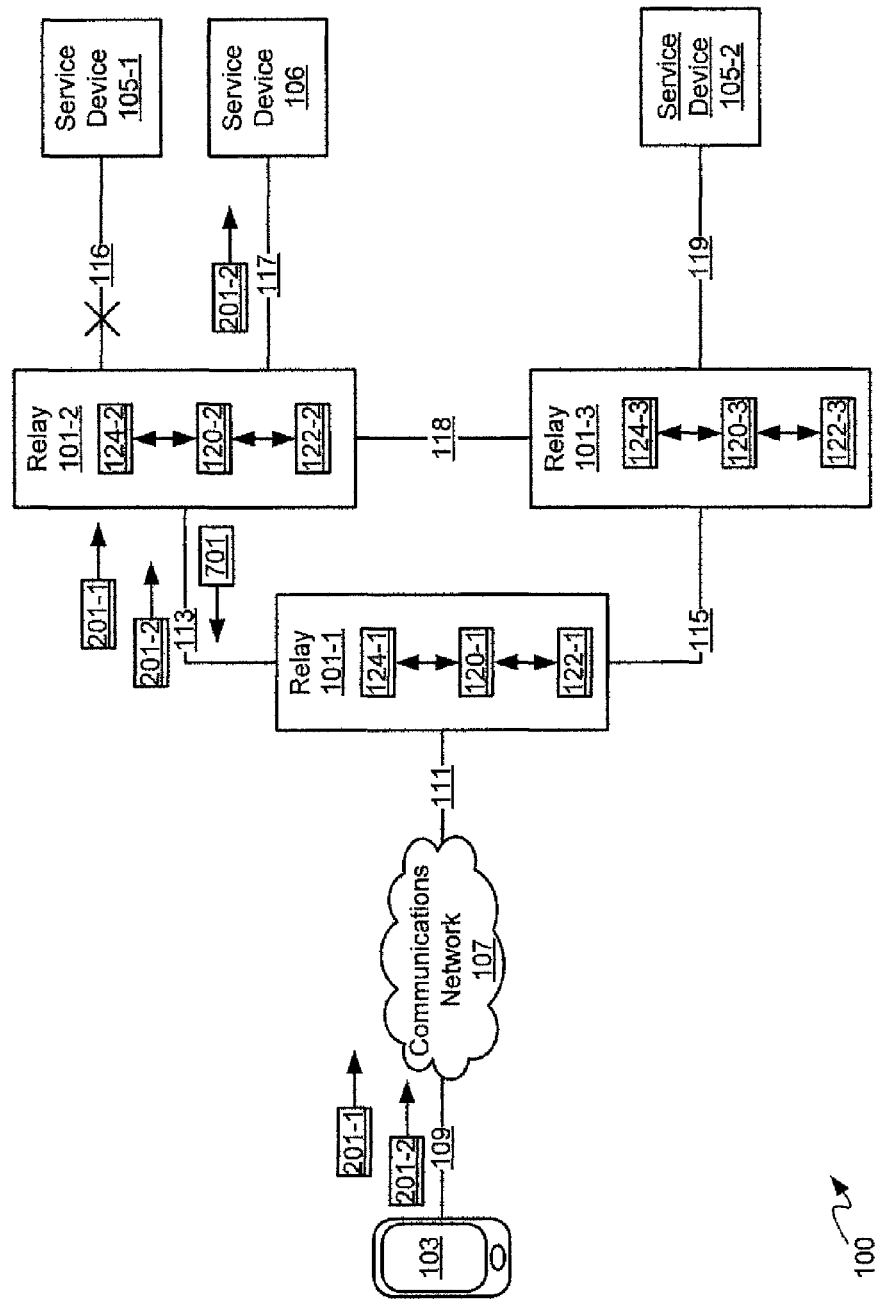
FIG. 7 depicts the system of FIG. 1 when the relay of FIG. 3 loses communication with a first service device, according to non-limiting implementations.

However, also with reference to FIG. 7, regardless of data in routing table 232, it is further understood that relay 101-2 is no longer in communication with service device 105-1. Such a situation can occur when service device 105-1 becomes inoperable, either permanently or temporarily (e.g. service device 105-1 can be temporarily shut down for maintenance), and/or when link 116 is lost, and/or severed, either permanently or temporarily (e.g. due to network disruptions and the like).

In any event, when relay 101-2 receives message 201-1, processor 120-2 determines that message 201-1 is associated with the service provided by service device 105-1 from the identifier in message 201-1. However, as relay 101-2 is no longer in communication with service device 105-1, relay 101-2 transmits an indication 701 to relay 101-1, via link 113, indication 701 indicating that the service associated with service device 105-1 is unavailable.

Indication 701 is then received at relay 101-1, and processor 120-1 can determine that relay 101-1 is no longer in communication with service device 105-1 by receiving indication 701 from relay 101-2. It is further appreciated that, in described non-limiting implementations, indication 701 is received in response to transmitting message 201-1 to relay 101-2. Relay 101-2 further transmits message 201-1 back to relay 101-1.

However, in other implementations, when relay 101-2 determines that relay 101-2 is no longer in communication with service device 105-1 and transmits indication 701 independent of whether message 201-1 is received at relay 101-2; indeed, in implementations where indication 701 is received at relay 101-1 prior to message 201-1 being received at relay 101-1, message 201-1 is not transmitted to relay 101-2 as relay 101-1 has already determined that relay 101-2 is not in communication with service device 105-1.

In response to determining that relay 101-2 is no longer in communication with first service device 105-2, at block 605 processor 120-1 determines whether another relay 101, including relay 101-3, is in communication with another service device, including service device 105-2, that provides a same service as service device 105-1, as described above. Such a determination can be made by processing routing table 232. Further, such a determination can be made in parallel with block 603.

When another relay is in communication with another service device providing a same service as service device 105-1 (i.e. a Yes" decision at block 605), for example, relay 101-3 is in communication with service device 105-2, at block 607 messages associated with the service provided by service device 105-1 are rerouted to the another relay. For example, attention is directed to FIG. 8, where message 201-1 is rerouted to relay 101-3. Attention is also directed to FIG. 9, which is substantially similar to FIG. 2, with like elements having like numbers, however it is appreciated that, in FIG. 9, message 201-2 is missing from queue 200-1 of connection object 230-1 (i.e. an outbound connection object for relaying messages 201 to relay 101-2) as message 201-2 was relayed to relay 101-2 at block 601. Further, message 201-1 has been rerouted to relay 101-3 by moving message 201-1 from queue 200-1 at connection object 230-1 to queue 200-3 at connection object 230-3 for relay to relay 101-3.

In any event, relay 101-1 continues to reroute messages associated with a service provided by service device 105-1 to relay 101-3 until it is determined that relay 101-2 is again in communication with service device 105-1 at block 611. While block 611 is described in further detail below, it is appreciated that, at block 611 a check occurs as to whether relay 101-2 has resumed communications with first service device 105-1; if not (i.e. a "No" decision at block 611), relay 101-1 continues to reroute messages to relay 101-3 at block 607 and/or again checks at block 605 whether another relay is in communication with another service device providing a similar service as service device 105-1 as described above (e.g. a check can be performed as to whether service device 105-2 is still in communication with relay 101-3). However, when it is determined at block 611 that relay 101-2 has resumed communications with first service device 105-1 (i.e. a "Yes" decision at block 611), normal communications resume in system 100 at block 613, with messages again being relayed to relay 101-2 for relay to service device 105-1 and/or load balancing occurs between relays 101-2, 101-3.

Returning to block 605, when no another relay is in communication with another service device providing a same service as service device 105-1 (i.e. a "No" decision at block 605: e.g. service device 105-2 is off-line and/or not present in system 100), at block 609 messages associated with the service provided by service device 105-1 are queued for delayed relay to relay 101-2 when relay 101-2 is again in communication with service device 105. For example, attention is directed to FIG. 10 which is substantially similar to FIG. 2, with like elements having like numbers, however it is appreciated that, in FIG. 10, message 201-2 is missing from queue 200-1 of connection object 230-1 (i.e. an outbound connection object for relaying messages 201 to relay 101-2) as message 201-2 was relayed to relay 101-2 at block 601. Further, message 201-1 remains in queue 200-1 at connection object 230-1, however, message 201-1 is placed position in queue 200-1 for delayed relay, until relay 101-2 is again in communication with service device 105-1.

Figure 11:
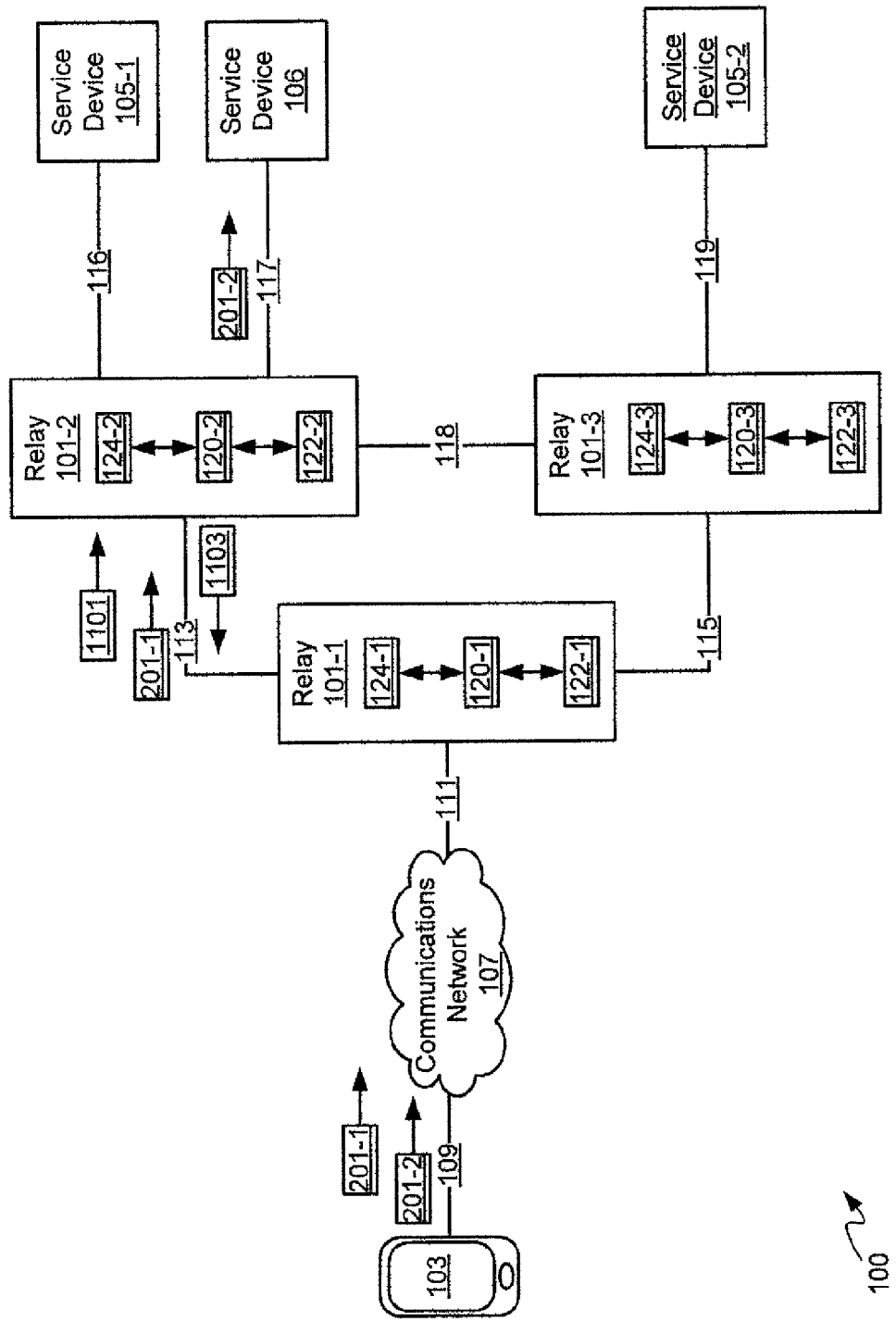
FIG. 11 depicts the system of FIG. 1 with the first relay querying the second relay to determine when the second relay re-establish communications with the first service device, and transmitting queued messages thereafter according to non-limiting implementations.

Returning to FIG. 6, at block 611, processor 120-1 determines whether relay 101-2 is again in communication with service device 105-1, for example by transmitting a query 1101 to relay 101-2, as depicted in FIG. 11. In response, indication 1103 is received at relay 101-1 from relay 10-2 indicating whether relay 101-2 is in communication with service device 105-1. When relay 101-2 is not yet in communication with service device 105-1, indication 1103 can be indicative of such (i.e. indication 1103 is negative). Hence, further queries similar to query 1101 can be periodically transmitted to relay 101-2 as described below with reference to FIG. 12, until indication 1103 (or a similar indication is transmitted in response to a further query) indicates that relay 101-2 is in communication with service device 105-1. Indeed, as further depicted in FIG. 11, link 116 has been re-established and hence indication 1103 is positive.

In alternative non-limiting implementations, relay 101-1 does not transmit query 1101; rather relay 101-2 transmits indication 1103 when communication with service device 105-1 is re-established.

In any event, when it is determined at block 611 that relay 101-2 is still not in communication with service device 105-1 (i.e. a "No" decision at block 611: indication 1103 is negative), block 605 can be repeated in the event that another service device providing the same service as service device 105-1 has come on-line in system 100; alternatively, block 609 can be repeated so that messages associated with the service provided by service device 105-1 continue to queue at relay 101-1.

However, when it is determined at block 611 that relay 101-2 is in communication with service device 105-1 (i.e. a "Yes" decision at block 611: indication 1103 is positive), at block 613 messages associated with the service provided by service device 105-1, including message 201-1, are relayed to relay 101-2. For example, message 201-1 queued at queue 200-1 is transmitted to relay 101-2. Further, when block 611 occurs while service device 105-2 is available, at block 613 load balancing algorithms are again applied at relay 101-1 to relay a first portion of messages associated with the service provided by service devices 105 to relay 105-1 and a second portion of the messages to relay 105-2.

It is yet further appreciated that, in other implementations, a combination of blocks 609 and 607 can occur. For example, when a number of messages is above a threshold value indicative of a number of messages that could overwhelm relay 101-3, some messages are relayed to relay 101-3 at block 607 while other messages are queued at relay 101-1 for delayed relay to one or more of relays 101-2, 101-3, for example when the number of messages drops below the threshold value and/or relay 101-2 is again in communication with service device 105-1. In other words, in some implementations, blocks 609 and 607 can occur in parallel with each other. Hence, when it is determined that relay 101-2 is no longer in communication with service device 105-1, in response, one or more of the following can occur: queuing of messages for delayed relay to relay 101-2 when relay 101-2 is again in communication with service device 105-1; and rerouting of messages to relay 101-3 when relay 101-3 is in communication with service device 105-2 providing a same service as service device 105-1.

Figure 12:
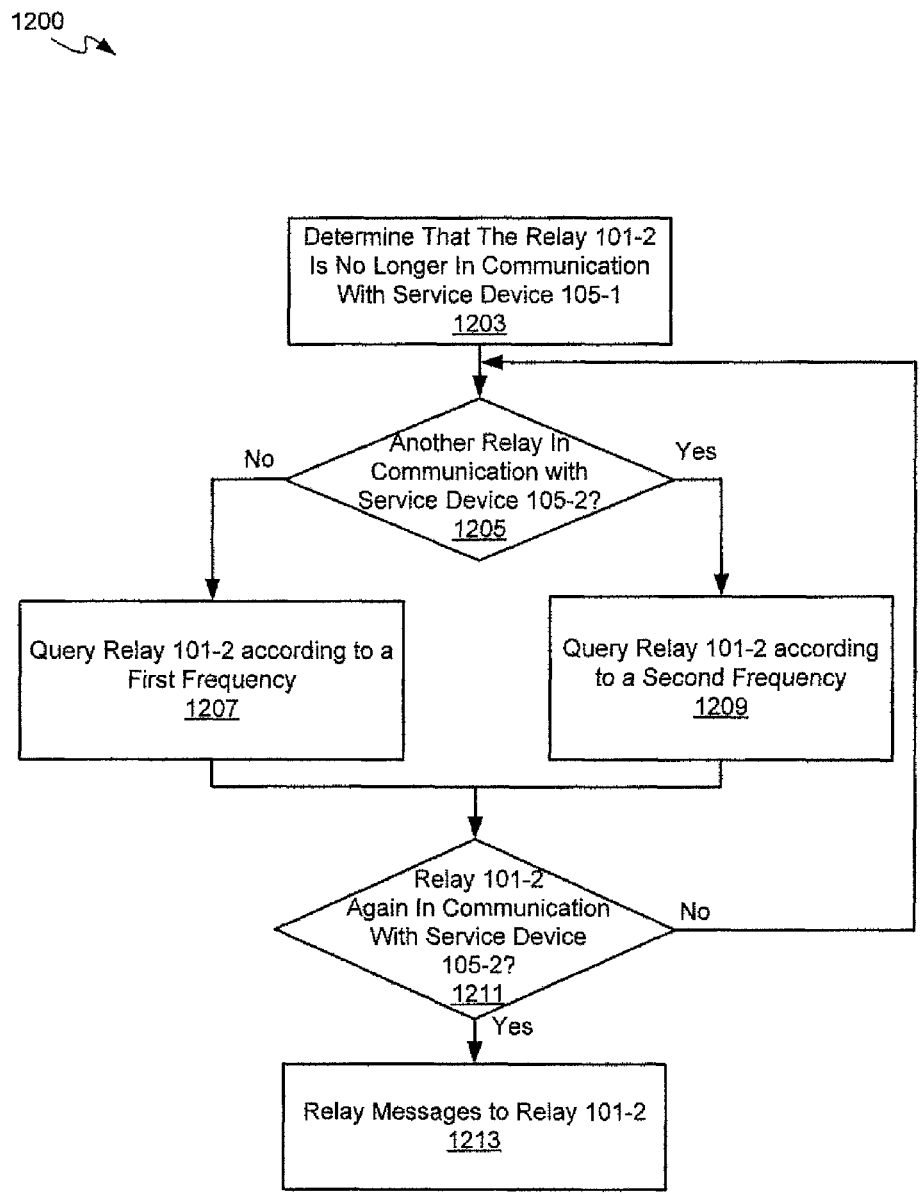
FIG. 12 depicts a flowchart of a method for querying a relay to determine restoration of a service, according to non-limiting implementations.

Attention is now directed to FIG. 12 which depicts a flowchart of a method 1200 for querying a relay to determine restoration of a service according to non-limiting implementations. In order to assist in the explanation of method 1200, it will be assumed that method 1200 is performed using system 100. Furthermore, the following discussion of method 1200 will lead to a further understanding of system 100 and its various components. However, it is to be understood that system 100 and/or method 1200 can be varied, and need not work exactly as discussed herein in conjunction with each other, and that such variations are within the scope of present implementations.

It is appreciated that, in some implementations, method 1200 is implemented in system 100 by processor 120-1 of relay 101-1. Indeed, method 1200 is one way in which relay 101-1 can be configured. It is to be emphasized, however, that method 1200 need not be performed in the exact sequence as shown, unless otherwise indicated; and likewise various blocks may be performed in parallel rather than in sequence; hence the elements of method 1200 are referred to herein as "blocks" rather than "steps". It is also to be understood, however, that method 1200 can be implemented on variations of system 100 as well.

It is further appreciated that method 1200 can be implemented in parallel with method 600, and that blocks 1203, 1205, 1211 and 1213 are respectively similar to blocks 603, 605, 611 and 613 described above. It is further appreciated that blocks 1207, 1209 can be performed in parallel with block 611 and/or block 1211 of methods 600, 1200 respectively.

In any event, at block 1203 processor 120-1 determines that relay 101-2 is no longer in communication with service device 105-1, as described above with respect to block 603. At block 1205 processor determines another relay in system 100 is in communication with another service device providing the same service as service device 105-1, for example service device 105-2, as described above with respect to block 1205.

When there are no other relays in communication with another service device providing the same service as service device 105-1 (i.e. a "No" decision at block 1205), at block 1207, processor 120-1 queries relay 101-2 according to a first frequency. However, when another relay, such as relay 101-3, is in communication with another service device, such as service device 105-2, providing the same service as service device 105-1, (i.e. a "Yes" decision at block 1205), at block 1207, processor 120-1 queries relay 101-2 according to a second frequency, the second frequency less than the first frequency.

For example, each of blocks 1207, 1209 can comprise processor 120-1 transmitting queries similar to query 1101, as described above, to relay 101-2, to determine when relay 101-2 is in communication with service device 105-1, and in response, receiving in indications of such from relay 101-2, similar to indication 1103. However, when there are no other relays in system 100 that are in communication with a service device providing the same service as service device 105-1, the queries are sent out more frequently than when there is at least one redundant service device in system 100. Hence, queries at block 1207 are transmitted at the first frequency, and queries at block 1209 are transmitted at the second frequency. Put another way, queries to relay 101-2 are transmitted more aggressively when there are no redundant service devices in system 100, as compared to when there is at least one redundant service device in system 100. For example, the first frequency can be about 10 times higher than the second frequency.

In any event, it is appreciated that methods 600, 1200 can be implemented at relay 101-1, and any other relays in system 100 that are relaying messages to relays 101-2, 101-3. Indeed, another solution for addressing temporary service device loss could be to transmit and queue all associated messages to relay 101-2 from all other relays in system 100, to wait for communications to be re-established with service device 105-1; however, this could have the effect of overwhelming relay 101-2 with hundreds, thousands, or even millions of messages, which could quickly exceed the capacity of queues and/or storage of relay 101-2. By implementing methods 600, 1200 at each relay that is respectively relaying messages associated with service device 105-1 to relay 101-2, storage of such messages is distributed throughout system 100 and operation of relay 101-2 is generally improved as the risk of overwhelming relay 101-2 is lessened.

Those skilled in the art will appreciate that in some implementations, the functionality of relays 101 can be implemented using pre-programmed hardware or firmware elements (e.g., application specific integrated circuits (ASICs), electrically erasable programmable read-only memories (EEPROMs), etc.), or other related components. In other implementations, the functionality of relays 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever Persons skilled in the art will appreciate that there are yet more alternative implementations and modifications possible, and that the above examples are only illustrations of one or more implementations. The scope, therefore, is only to be limited by the claims appended hereto.

What is claimed is:

1. A relay device comprising:
a processor; and,
a communication interface enabled to communicate first messages and second messages to a first relay in communication with a first service device, the first messages associated with a first service associated with the first service device, the second messages associated with one or more second services associated with one or more other service devices, the first relay configured to: relay the first messages to the first service device; and relay the second messages to one or more of the other service devices,
the processor enabled to:
relay the second messages to the first relay;
determine that the first relay is no longer in communication with the first service device by receiving an indication from the first relay indicating that a service is unavailable for a given identifier associated with the service provided by the service device, the first messages comprising the given identifier; and, in response, one or more of,
queue the first messages for delayed relay to the first relay when the first relay is again in communication with the first service device; and,
reroute the first messages to a second relay when the second relay is in communication with a second service device providing a same service as the first service device.

2. The relay device of claim 1, wherein the processor is further enabled to:
determine that the first relay is again in communication with the first service device; and, in response,
relay the first messages to the first relay.

3. The relay device of claim 1, wherein the processor is further enabled to periodically query the first relay to determine when the first relay is again in communication with the first service device.

4. The relay device of claim 1, wherein the processor is further enabled to query the first relay to determine when the first relay is again in communication with the first service device at one of:
   a first frequency, when there are no other relays in communication with another service device providing the same service as the first service device; and,
   a second frequency, when the second relay is in communication with the second service device providing the same service as the first service device, the second frequency less than the first frequency.

5. The relay device of claim 1, wherein each of the first messages comprises an identifier associated with the service provided by the service device.

6. The relay device of claim 5, wherein each of the second messages comprises a respective identifier different from the first identifier.

7. The relay device of claim 1, wherein the indication is received in response to transmitting a given message of the first messages to the first relay.

8. The relay device of claim 1, wherein the processor is further enabled to, when the first relay is in communication with the first service device and the second relay is in communication with the second service device, relay a first portion of the first messages to the first relay and relay a second portion of the first messages to the second relay.

9. The relay device of claim 1, further comprising at least one of a router, a relay and a switch.

10. A method comprising:
   at a relay device comprising a processor and a communication interface enabled to communicate first messages and second messages to a first relay in communication with a first service device, the first messages associated with a first service associated with the first service device, the second messages associated with one or more second services associated with one or more other service devices, the first relay configured to: relay the first messages to the first service device; and relay the second messages to one or more of the other service devices,
   relaying the second messages to the first relay;
   determining that the first relay is no longer in communication with the first service device by receiving an indication from the first relay indicating that a service is unavailable for a given identifier associated with the service provided by the service device, the first messages comprising the given identifier; and, in response, one or more of,
      queuing the first messages for delayed relay to the first relay when the first relay is again in communication with the first service device;
      rerouting the first messages to a second relay when the second relay is in communication with a second service device providing a same service as the first service device.

11. The method of claim 10, further comprising:
   determining that the first relay is again in communication with the first service device; and, in response,
   relaying the first messages to the first relay.

12. The method of claim 10, further comprising periodically querying the first relay to determine when the first relay is again in communication with the first service device.

13. The method of claim 10, further comprising querying the first relay to determine when the first relay is again in communication with the first service device at one of:
   a first frequency, when there are no other relays in communication with another service device providing the same service as the first service device; and,
   a second frequency, when the second relay is in communication with the second service device providing the same service as the first service device, the second frequency less than the first frequency.

14. The method of claim 10, wherein each of the first messages comprises an identifier associated with the service provided by the service device.

15. The method of claim 14, wherein each of the second messages comprises a respective identifier different from the first identifier.

16. The method of claim 10, wherein the indication is received in response to transmitting a given message of the first messages to the first relay.

17. The method of claim 10, further comprising, when the first relay is in communication with the first service device and the second relay is in communication with the second service device, relay a first portion of the first messages to the first relay and relay a second portion of the first messages to the second relay.

18. A non-transitory computer program product, comprising a non-transitory computer usable medium having a computer readable program code adapted to be executed to implement a method comprising:
   at a relay device comprising a processor and a communication interface enabled to communicate first messages and second messages to a first relay in communication with a first service device, the first messages associated with a first service associated with the first service device, the second messages associated with one or more second services associated with one or more other service devices, the first relay configured to: relay the first messages to the first service device; and relay the second messages to one or more of the other service devices,
   relaying the second messages to the first relay;
   determining that the first relay is no longer in communication with the first service device by receiving an indication from the first relay indicating that a service is unavailable for a given identifier associated with the service provided by the service device, the first messages comprising the given identifier; and, in response, one or more of,
      queuing the first messages for delayed relay to the first relay when the first relay is again in communication with the first service device; and,
      rerouting the first messages to a second relay when the second relay is in communication with a second service device providing a same service as the first service device.

* * * * *